US006782424B2

(12) United States Patent
Yodaiken

(10) Patent No.: US 6,782,424 B2
(45) Date of Patent: Aug. 24, 2004

(54) SYSTEM, METHOD AND COMPUTER PROGRAM PRODUCT FOR MONITORING AND CONTROLLING NETWORK CONNECTIONS FROM A SUPERVISORY OPERATING SYSTEM

(75) Inventor: Victor J. Yodaiken, Socorro, NM (US)

(73) Assignee: Finite State Machine Labs, Inc., Socorra, NM (US)

( * ) Notice: Subject to any disclaimer, the term of this patent is extended or adjusted under 35 U.S.C. 154(b) by 89 days.

(21) Appl. No.: 10/226,106

(22) Filed: Aug. 23, 2002

(65) Prior Publication Data

US 2004/0098473 A1 May 20, 2004

(51) Int. Cl.[7] ............................................. G06F 15/173
(52) U.S. Cl. ....................................... 709/224; 719/318
(58) Field of Search ................................ 709/223–229, 709/230; 719/318

(56) References Cited

U.S. PATENT DOCUMENTS

| 5,345,587 | A | | 9/1994 | Fehskens et al. |
|---|---|---|---|---|
| 5,504,814 | A | | 4/1996 | Miyahara |
| 5,530,758 | A | | 6/1996 | Marino, Jr. et al. |
| 5,721,922 | A | | 2/1998 | Dingwall |
| 5,903,752 | A | | 5/1999 | Dingwall et al. |
| 5,958,010 | A | | 9/1999 | Agarwal et al. |
| 5,987,621 | A | | 11/1999 | Duso et al. |
| 5,995,745 | A | | 11/1999 | Yodaiken |
| 6,061,709 | A | | 5/2000 | Bronte |
| 6,125,390 | A | | 9/2000 | Touboul |
| 6,137,862 | A | | 10/2000 | Atkinson et al. |
| 6,157,959 | A | | 12/2000 | Bonham et al. |
| 6,243,753 | B1 | | 6/2001 | Machin et al. |
| 6,377,994 | B1 | | 4/2002 | Ault et al. |
| 6,385,643 | B1 | | 5/2002 | Jacobs et al. |
| 6,658,465 | B1 | * | 12/2003 | Touboul ...................... 709/223 |
| 2001/0044904 | A1 | | 11/2001 | Berg et al. |
| 2002/0026505 | A1 | | 2/2002 | Terry |

OTHER PUBLICATIONS

Gregory Bollella, Kevin Jeffay, "Support For Real–Time Computing Within General Purpose Operating Systems", Proceedings of the IEEE Real–Time Technology and Applications Symposium, May 1995, pp. 4–14.
Paul A. Karger et al., "A Retrospective On The VAX VMM Security Kernel", IEEE Transactions on Software Engineering, Nov. 1991, pp. 1147–1165, vol. 17, No. 11.
REDSonic, Inc., www.redsonic.com/en/products/RealTime.htm, pp. 1–4, Copyright 2002.

* cited by examiner

*Primary Examiner*—St. John Courtenay, III
(74) *Attorney, Agent, or Firm*—Rothwell, Figg, Ernst & Manbeck

(57) ABSTRACT

A system, method and computer program product that is designed to support high-availability, rapid fault recovery, out of band condition signaling and/or other quality of service assurances and security in a networked environment. In one aspect, a method of the invention includes the step of providing a processing system with a dual-kernel or multi-kernel software operating system. The operating system includes a supervisory operating system and a secondary operating system that provides network functions to user applications. The method also includes the step of providing a Network Control Software (NCS) in the supervisory operating system. The NCS is configured to transparently monitor and control network operations in the secondary operating system.

36 Claims, 10 Drawing Sheets

SYSTEM, METHOD AND COMPUTER PROGRAM PRODUCT FOR MONITORING AND CONTROLLING NETWORK CONNECTIONS FROM A SUPERVISORY OPERATING SYSTEM

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

COMPUTER PROGRAM LISTING APPENDIX

A computer program listing appendix incorporating features of the present invention is being submitted herewith on a compact disc in compliance with 37 C.F.R. §1.52(e), and is incorporated herein by reference in its entirety. The computer program listing appendix is being submitted on a first compact disc labeled "Copy 1" and on a second compact disc labeled "Copy 2." The disc labeled Copy 2 is an exact duplicate of the disc labeled Copy 1. The files contained on each disc are:

sourcecode\apps\ipv4\plugins\1net_ft.c, 7895, Aug 15 14:36;
sourcecode\apps\ipv4\plugins\Makefile, 713, Aug 15 14:36;
sourcecode\apps\ipv4\plugins\1net_icmp.c, 13785, Aug 15 14:36;
sourcecode\apps\ipv4\plugins\1net_udp.c, 11309, Aug 15 14:36;
sourcecode\apps\ipv4\plugins\1net_tabldr.c, 999, Aug 15 14:36;
sourcecode\apps\ipv4\1net_ipv4.c, 15626, Aug 15 14:36;
sourcecode\apps\ipv4\Makefile, 541, Aug 15 14:36;
sourcecode\apps\gpos\1net_gpos.c, 17258, Aug 15 14:36;
sourcecode\apps\gpos\Makefile, 466, Aug 15 14:36;
sourcecode\apps\arp\Makefile, 457, Aug 15 14:36;
sourcecode\apps\arp\1net_arp.c, 10964, Aug 15 14:36;
sourcecode\scripts\defconfig, 426, Aug 15 14:36;
sourcecode\scripts\ft, 0, Aug 15 14:36;
sourcecode\scripts\functions.sh, 7148, Aug 15 14:36;
sourcecode\scripts\config.in, 1336, Aug 15 14:36;
sourcecode\scripts\test_udp, 3300, Aug 15 14:36;
sourcecode\scripts\test_ip, 3271, Aug 15 14:36;
sourcecode\scripts\Menuconfig, 30024, Aug 15 14:36;
sourcecode\scripts\Configure, 12372, Aug 15 14:36;
sourcecode\scripts\mkdep.c, 12136, Aug 15 14:36;
sourcecode\scripts\Makefile, 1597, Aug 15 14:36;
sourcecode\scripts\unload_arp, 659, Aug 15 14:36;
sourcecode\scripts\load_ip, 3008, Aug 15 14:36;
sourcecode\scripts\test_arp, 2077, Aug 15 14:36;
sourcecode\scripts\load_arp, 1153, Aug 15 14:36;
sourcecode\scripts\test_1net, 3239, Aug 15 14:36;
sourcecode\scripts\ins1net, 3885, Aug 15 14:36;
sourcecode\scripts\localinfo, 372, Aug 15 14:36;
sourcecode\scripts\hosts, 651, Aug 15 14:36;
sourcecode\scripts\rm1net, 1124, Aug 15 14:36;
sourcecode\scripts\ping, 2153, Aug 15 14:36;
sourcecode\scripts\addip, 3173, Aug 15 14:36;
sourcecode\scripts\unload_ip, 1137, Aug 15 14:36;
sourcecode\scripts\msgbox.c, 2529, Aug 15 14:36;
sourcecode\scripts\inputbox.c, 6179, Aug 15 14:36;
sourcecode\scripts\yesno.c, 3067, Aug 15 14:36;
sourcecode\scripts\colors.h, 5384, Aug 15 14:36;
sourcecode\scripts\checklist.c, 9584, Aug 15 14:36;
sourcecode\scripts\menubox.c, 12716, Aug 15 14:36;
sourcecode\scripts\dialog.h, 5936, Aug 15 14:36;
sourcecode\scripts\textbox.c, 15584, Aug 15 14:36;
sourcecode\scripts\util.c, 9604, Aug 15 14:36;
sourcecode\scripts\1xdialog.c, 6023, Aug 15 14:36;
sourcecode\main\1net.c, 21899, Aug 15 14:36;
sourcecode\main\Makefile, 172, Aug 15 14:36;
sourcecode\include\1net.h, 6253, Aug 15 14:36;
sourcecode\include\1net_udp.h, 3463, Aug 15 14:36;
sourcecode\include\1net_icmp.h, 2856, Aug 15 14:36;
sourcecode\include\1net_arp.h, 1417, Aug 15 14:36;
sourcecode\include\1net_ipv4.h, 4172, Aug 15 14:36;
sourcecode\include\1net_hw.h, 1673, Aug 15 14:36;
sourcecode\include\1net_gpos.h, 1435, Aug 15 14:36;
sourcecode\doc\api.txt, 7841, Aug 15 14:36;
sourcecode\doc\ipv4.txt, 6923, Aug 15 14:36;
sourcecode\doc\udp.txt, 4171, Aug 15 14:36;
sourcecode\doc\arp.txt, 2664, Aug 15 14:36;
sourcecode\doc\icmp.txt, 4136, Aug 15 14:36;
sourcecode\doc\gpos.txt, 5055, Aug 15 14:36;
sourcecode\doc\faq.txt, 4855, Aug 15 14:36;
sourcecode\doc\getting_started.txt, 3690, Aug 15 14:36;
sourcecode\doc\configuration.txt, 1847, Aug 15 14:36;
sourcecode\doc\scripts.txt, 2663, Aug 15 14:36;
sourcecode\doc\Configure.help, 4154, Aug 15 14:36;
sourcecode\GNUmakefile, 4188, Aug 15 14:36;
sourcecode\drivers\1net_pcnet32.c, 21711, Aug 15 14:36; sourcecode\drivers\1net_3c905.c, 34753, Aug 15 14:36;
sourcecode\drivers\1net_eepro100.c, 30847, Aug 15 14:36; sourcecode\drivers\Makefile, 624, Aug 15 14:36; sourcecode\tests\1net_arp_test\1net_arp_test.c, 2039, Aug 15 14:36;
sourcecode\tests\1net_arp_test\Makefile, 488, Aug 15 14:36;
sourcecode\tests\1net_ip_test\1net_ip_test.c, 10396, Aug 15 14:36;
sourcecode\tests\1net_ip_test\Makefile, 483, Aug 15 14:36;
sourcecode\tests\1net_ping\1net_ping.c, 6487, Aug 15 14:36;
sourcecode\tests\1net_ping\Makefile, 465, Aug 15 14:36;
sourcecode\tests\1net_udp_test\1net_udp_test.c, 10254, Aug 15 14:36;
sourcecode\tests\1net_udp_test\Makefile, 488, Aug 15 14:36;
sourcecode\tests\1net_test\1net_test.c, 9744, Aug 15 14:36;
sourcecode\tests\1net_test\Makefile, 181, Aug 15 14:36;
sourcecode\skeletons\1net_ipv4_plugin.c, 4926, Aug 15 14:36;
sourcecode\skeletons\1net_driver.c, 22332, Aug 15 14:36;
sourcecode\skeletons\1net_decoupled_app.c, 5523, Aug 15 14:36;
sourcecode\skeletons\1net_simple_app.c, 4510, Aug 15 14:36;
sourcecode\skeletons\Makefile, 284, Aug 15 14:36;
sourcecode\Rules.make, 188, Aug 15 14:36;
sourcecode\Copyright, 76, Aug 15 14:37.

BACKGROUND OF THE INVENTION

1. Field of the Invention

The present invention relates to computer networks and data processing systems and, more specifically, to and a system, method, and computer program product for monitoring and controlling network connections from a supervisory operating system.

2. Discussion of the Background

Networked computers cooperating on computations or implementing communication systems, such as SS7, are subject to hardware failures in communication links, switches, hubs, and network hosts, as well as software failures in software implementing or using communication protocols. As network speeds increase and as quality demands increase on service providers, controlling bandwidth allocation, responding to out of band events, and monitoring performance and security becomes critical. However, most networking protocols do not directly or efficiently allow for this type of functionality. For example, TCP/IP, a widely used networking protocol, is designed to be tolerant of timing fluctuations and therefore does not have a method of rapidly discovering network failures. During the operation of a network stack, handling of timing events or out of band signals may be delayed by stack or operating system scheduling. Other drawbacks and disadvantages exist.

"A Retrospective on the VAX VMM Security Kernel," by Karger et al. describes the development of a virtual-machine monitor (VMM) security kernel for the VAX architecture. The focus is on how the system's hardware, microcode, and software are aimed at meeting A1-level security requirements while maintaining the standard interfaces and applications of the VMS and ULTRIx-32 operating systems. The VAX security kernel supports multiple concurrent virtual machines on a single VAX system, providing isolation and controlled sharing of sensitive data. However, computer networking is not discussed.

Other background references include: U.S. Pat. No. 6,385,643 issued to Jacobs et al.; U.S. Pat. No. 5,958,010 issued to Agarwal et al., U.S. Pat. No. 5,721,922 issued to Dingwall, and "Support For Real-Time Computing Within General Purpose Operating System," by G. Bollella et al.

SUMMARY OF THE INVENTION

It is an object of the invention to enable a system to monitor and control a networked environment.

It is another object of the invention to enable the system to provide high-availability, rapid fault recovery, out of band condition signaling and/or other quality of service assurances and security in a networked environment.

It is another object of the invention to enable a the system to detect and prevent a network-based attack such as, for example, a denial of service attack.

These and other object are achieved by the present invention. In one aspect, a method of the present invention includes the step of providing a processing system (e.g., a general purpose computer, a specific purpose computer, a network router, a network switch, or other processing device) with at least two operating systems, which are referred to as a supervisory operating system and a secondary operating system. In one embodiment, the secondary operating system is a task supervised by the supervisory operating system. The supervisory system may be a real-time operating system, but this is not a requirement.

The method also includes the step of providing a Network Control Software (NCS) in the supervisory operating system. The NCS is an application of the supervisory operating system and is interposed between hardware network device drivers and network clients in the secondary operating system. These network clients may communicate with the NCS via protocol stacks of the secondary operating system or directly, for example, using shared memory or a pseudo-device interface. The NCS is also able to communicate with the clients in the secondary operating system by reading and modifying state information in the secondary operating system and in the client application software.

Because the NCS is interposed between hardware network device drivers and network clients in the secondary operating system, the NCS may be configured to monitor and control network operations in the secondary operating system. For example, the NCS may be configured to monitor and/or control communication channels of the secondary operating system, provide high speed fail-over, protect against network based attacks, and provide a quality-of-service system that reduces resource contention for critical services.

In one embodiment, the NCS may monitor and control a networked environment. For example, the NCS may gather information from a network client message stream and from the protocol stacks implemented in the secondary operating system. The NCS may operate across the boundaries of the protocol stacks in the secondary operating system. For example, the NCS can gather information about the timing of a protocol implemented in the secondary operating system, even if the protocol does not itself track this information. The NCS can interpose control information into a data stream and/or capture this information from a data stream, and the NCS may relate and coordinate the operation of different protocols even if those protocols are logically unrelated within the secondary operating system.

Further, in the embodiments where the supervisory operating system is a real-time operating system, the NCS can operate to impose precise timing on its actions through the real-time capabilities of the supervisory operating system. For example, the NCS may be configured to send periodic updates of state to neighboring computer systems at precise intervals. Further, the NCS can inspect and modify the state of the protocol stacks and network clients in the secondary operating system. For example, the NCS may make use of a sophisticated TCP or T/TCP stack in the secondary operating system, but intervene to prevent waste of resources if the NCS detects a condition that is not detectable by the TCP or T/TCP protocol.

Advantageously, one of the applications of the NCS is that it can transparently add functionality to enhance existing network protocol stacks and applications in the secondary operating system. For example, instead of one attempting to modify a complex and highly tuned T/TCP protocol stack to prioritize transactions with a certain remote computer, the NCS can be used to impose this prioritization on the T/TCP stack of the secondary operating system by, for example, discarding or delaying messages from lower priority computers transparently to the T/TCP stack.

The above and other features and advantages of the present invention, as well as the structure and operation of preferred embodiments of the present invention, are described below with reference to the accompanying drawings.

BRIEF DESCRIPTION OF THE FIGURES

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DESCRIPTION OF THE INVENTION

While the present invention may be embodied in many different forms, there is described herein in detail an illustrative embodiment(s) with the understanding that the present disclosure is to be considered as an example of the principles of the invention and is not intended to limit the invention to the illustrated embodiment(s).

Figure 1:
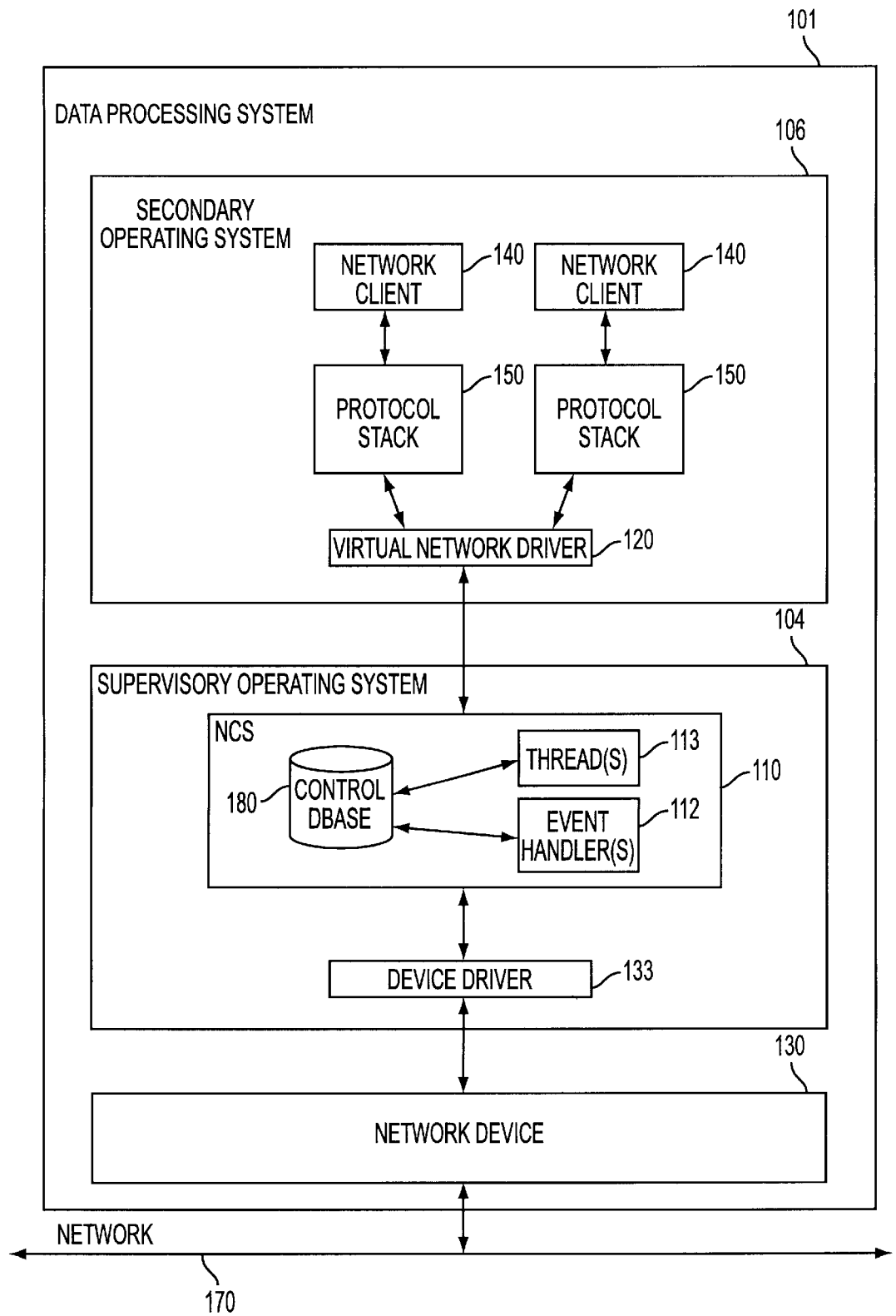
FIG. 1 is a functional block diagram of a system according to one embodiment of the invention.

FIG. 1 is a block diagram illustrating one embodiment of a computer system 101 according to the present invention. Computer system 101 includes a supervisory operating system 104 and a secondary operating system 106. Secondary operating system 106 provides network services to applications 140 (a.k.a., "network clients") through one one or more protocol stacks 150. For example, through the network services provided by secondary operating system 106, a network client 140 can transmit data to and receive data from network clients running on other data processing systems, provided, of course, that data processing system 101 and the other data processing systems are connected, directly or indirectly, to the same network (e.g., a network 170).

In one embodiment, supervisory operating system 104 executes the secondary operating system 106, but this is not a requirement. Additionally, interrupt control operations in secondary operating system 106 may be replaced with software emulation and supervisory operating system 104 may safely preempt the secondary operating system after very limited delays. It is not required that secondary operating system 106 be a traditional operating system, it may be a Java Virtual Machine, for example. A dual-kernel software operating system that can be used with the present invention is described in U.S. Pat. No. 5,995,745 (Yodaiken), which is fully incorporated herein by reference. One skilled in the art will appreciate that other multi-kernel operating systems could be used and the invention is not limited to any particular one.

As shown in FIG. 1, there is also provided a Network Control System (NCS) 110 in the supervisory operating system 104. NCS 110 is used to monitor and control network operations in secondary operating system 106 transparently from the secondary operating system's perspective. NCS 110 may further monitor and control the network environment. NCS 110 is an application of supervisory operating system 104 and may either be executed within the address space of supervisory operating system 104 or in a protected memory space. Network clients 140 that run on top of secondary operating system 106 may communicate with NCS 110 via one or more protocol stacks 150 of secondary operating system 106 or directly using, for example, shared memory or a pseudo-device interface (not shown). NCS 110 is also able to communicate with the one or more clients 140 by reading and modifying state information in secondary operating system 106 and in client 140 application software. NCS 110 may execute on a periodic schedule or by timeouts, or by the action of triggers from the lower level drivers.

In one embodiment, secondary operating system 106 is provided with one or more virtual network drivers (VNDs) 120 that emulate a network device driver. That is, a VND 120 appears to secondary operating system 106 and protocol stacks 150 to be a network device driver, such as device driver 133. Virtual network drivers 120 "transmit" and "receive" packets under control of NCS 110. Virtual network drivers 120 present an interface corresponding to a hardware device, for example, an Ethernet driver, or can present a higher level interface. For example, the Message Passing Interface (MPI) may be implemented as a virtual network driver 120 on a supercomputing cluster.

NCS 110 may operate across the boundaries of protocol stacks 150. For example, NCS 110 can gather information about the timing of a protocol implemented in secondary operating system 106, even if the protocol does not itself track this information, and NCS 110 may relate and coordinate the operation of different protocols even if those protocols are logically unrelated within secondary operating system 106. Further, NCS 110 can interpose control information into a message stream flowing through protocol stacks 150 and/or capture this information from the message stream.

Through the real-time capabilities of supervisory operating system 104, NCS 110 is operable to impose precise timing on its actions. For example, NCS 110 can send periodic updates of state (e.g., "keep alive messages") to neighboring computer systems at precise intervals. Further, NCS 110 can inspect and modify the state of the protocol stacks and application programs in the secondary operating system. For example, NCS 110 may make use of a sophisticated T/TCP stack in the secondary operating system, but intervene to prevent waste of resources if NCS 110 detects a condition that is not detectable by the T/TCP protocol.

In one embodiment, NCS 110 may include event handlers 112, threads 113, and a control database 180. An event handler 112 is a set of instructions for performing one or more functions. The event handler 112 is invoked upon the occurrence of a pre-defined event. For example, one event handler 112 may be invoked in response to device driver 133 receiving a data-packet (e.g., an Ethernet frame) from network device 130, while another event handler 112 is invoked in response to virtual device driver 120 receiving a data-packet from a higher layer protocol. Control database 180 permits NCS 110 to define arbitrary "logical connections". Examples of logical connections are TCP/IP connections, types of TCP/IP services, all communications with packets labeled by a particular hardware address or IP number, or a communication link specific to the real-time driver such as a request/response link with another site or group of sites. Control database 180 may be hard wired into the design of NCS 110, it may be a static data structure or it may be updated dynamically. Control database 180 may be supplemented or created entirely by a program executing under the control of the secondary operating system 106. For example, a SS7 system may include an information system running in the secondary operating system that keeps track of which calls are high priority. The SS7 system may update NCS 110 control database 180 to register calls that get priority for bandwidth being managed by NCS 110.

One application of NCS 110 is that it can transparently add functionality to existing network protocol stacks and applications. For example, instead of one attempting to modify a complex and highly tuned T/TCP protocol stack (or any other protocol stack) to prioritize transactions with a certain remote computer, NCS 110 can be used to impose this prioritization on the T/TCP stack of the secondary operating system by, for example, discarding or delaying messages from lower priority computers transparently to the T/TCP stack when necessary.

Another example of functionality that may be provided by NCS 110 includes providing fast fail over in a computing cluster. A computing cluster typically consists of a number of computers connected on a switched network, such as a switched Ethernet, Myranet, or custom "fabric." Common applications of a computing cluster include supercomputing applications and electronic commerce.

These clusters need to be able to react quickly to failures by shifting tasks to alternate computers not affected by the failure. NCS 110 can enable such quick reactions by detecting failures immediately or soon after they occur and then taking the appropriate corrective action or setting an alarm to indicate that a failure has occurred so that another process or an administrator can take the appropriate actions. In one example, control database 180 lists the address information of some number of other computers in the cluster that would form a "fail-over group." NCS 110 might begin by calibrating message delays on the network to these computers and then set up a schedule for regular exchange of packets between members of the fail-over group. As the schedule dictated, NCS 110 would send packets to other computers in the group to indicate that the computer system and secondary operating system with which the NCS is associated are live and making progress. Additionally, NCS 110 might monitor secondary operating system 106 by making sure that messages were moving through control stacks within secondary operating system 106, that key processes were being scheduled at appropriate rates, and that no software or hardware panics had been detected. NCS 110 may also operate alarms for other members of the fail-over group, resetting alarms when packets were received from the corresponding member of the fail-over group and taking some specified action when alarms expired.

In another application of present invention, computer system 101 implements a telephone switching system, such as an SS7 telephone switch. In this embodiment, NCS 110 is configured to detect the receipt of a control signal at the telephone switch and process the control signal as soon as it is received or pass the control signal to the appropriate module for processing. Thus, the present invention ensures that control signals are acted upon in a timely manner while less critical messages can be passed up to a protocol stack of secondary operating system 106. As a concrete example, a control message indicating that a line is not accessible can trigger an immediate action by NCS 110 to redirect data messages via a secondary line, transparently to the protocol stacks in secondary operating system 106.

The present invention can also be used to prevent theft or denial of service (DOS) attacks. Additionally, the present invention can be used to provide a quality-of-service system that can schedule services and reduce resource contention for critical services. One skilled in the art will appreciate that these uses of the present invention are exemplary only, and that there are other uses of the present invention.

Figure 2:
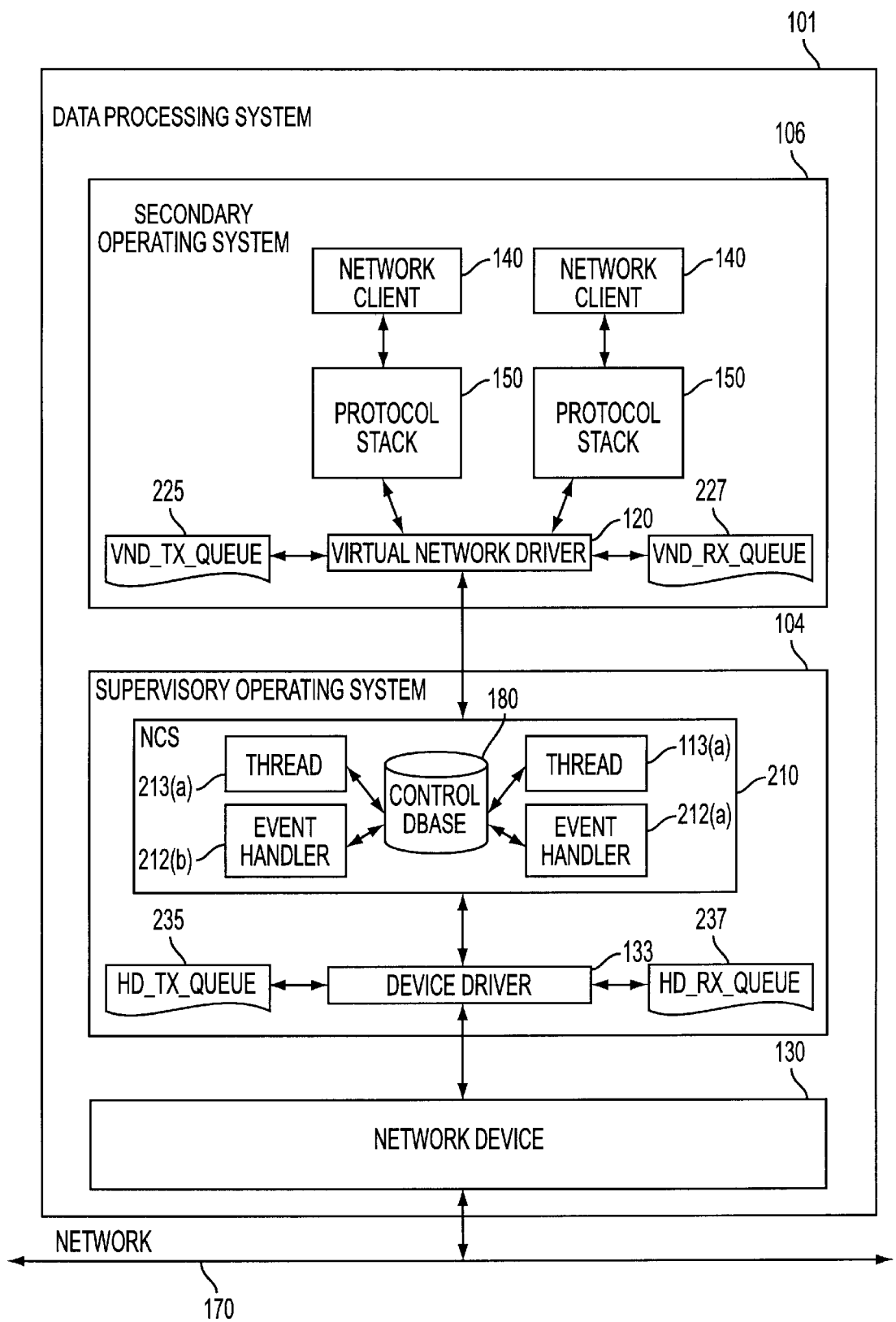
FIG. 2 is a functional block diagram of an example embodiment of an NCS that can function to perform fast fail-over, monitor TCP connections, and prevent denial of service (DOS) attacks in a system according to one embodiment of the invention.

With reference to FIG. 2, a functional block diagram of an example embodiment of an NCS 210 that can function to perform fast fail-over, monitor TCP connections, and prevent denial of service (DOS) attacks is shown. NCS 210 includes two event handlers (event handler 212(*a*) and event handler 212(*b*)) and two threads (thread 213(*a*) and thread 213(*b*)). Event handler 212(*a*) is invoked after network device 130 receives a data-packet from network 170. When network device 130 receives a data-packet from network 170, the received data-packet is passed to network driver 133, which places the received packet in queue 237 (a.k.a., hd_rx_queue 237) and invokes event handler 212(*a*). Event handler 212(*b*) is invoked when network device 130 transmits a data-packet (e.g., an Ethernet frame) onto network 170. Thread 213(*a*) performs fail-over monitoring and thread 213(*b*) performs TCP monitoring.

Figure 3:
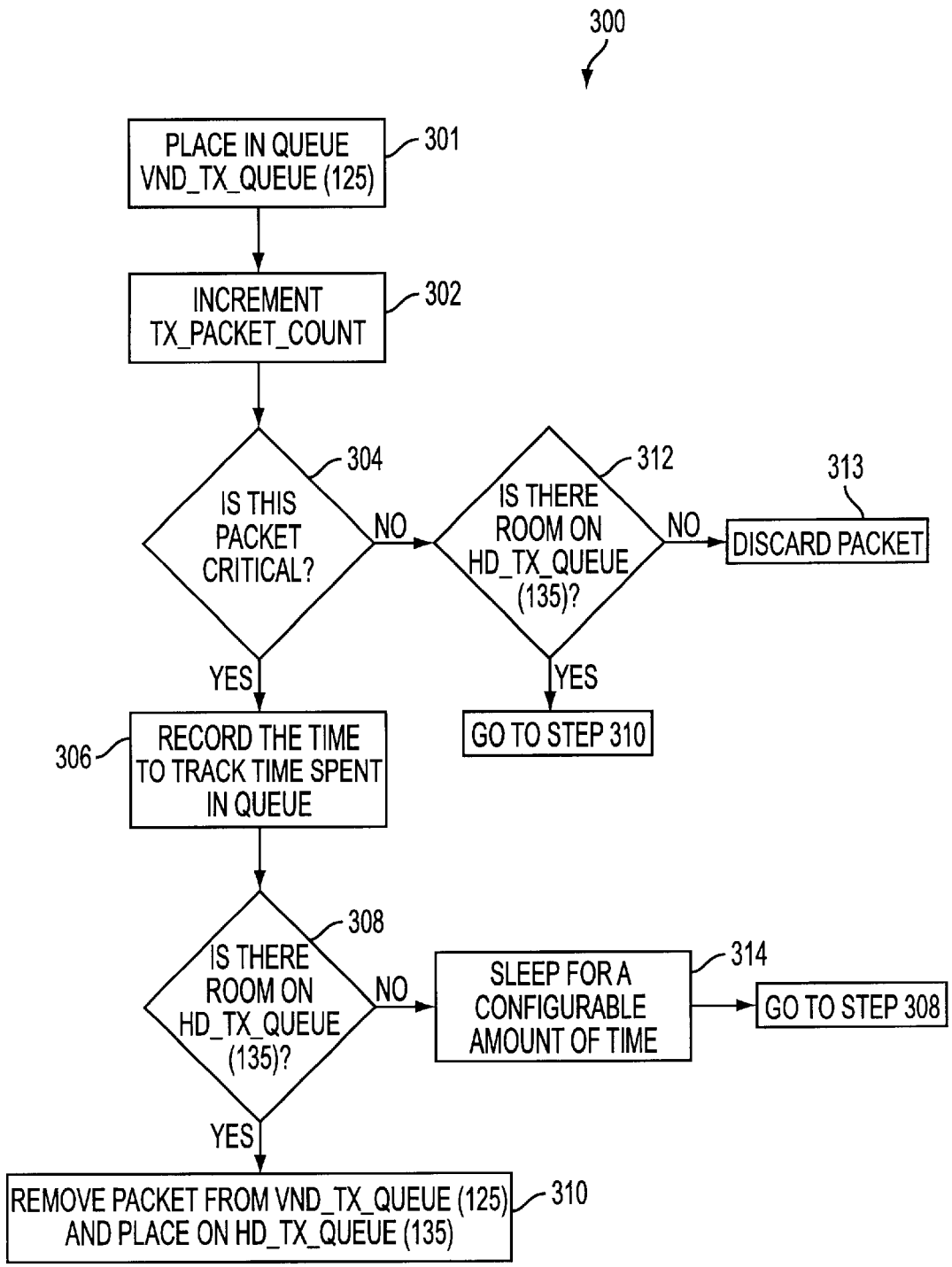
FIG. 3 is a flow chart illustrating a process 300 performed by VND when a stack generates a packet for transmission in a system according to one embodiment of the invention.

FIG. 3 is a flow chart illustrating a process 300 performed, at least in part, by VND 120 when a stack 150 generates a packet for transmission. Process 300 begins in step 301, where the generated packet is placed in queue 225 (a.k.a., vnd_tx_queue 225). In step 302, VND 120 increments a variable called tx_packet_count. In step 304, VND 120 determines whether the packet is a critical packet. That is, VND 120 determines whether the packet is a TCP packet that originated from a TCP port that has been labeled as being "critical." In one embodiment, a list of the critical TCP ports is maintained in control database 180. If the packet is a critical packet, then control passes to step 306, otherwise the process proceeds to step 312.

In step 306, VND 120 records the current time so that NCS 110 can keep track of how long the TCP packet is queued before it is finally transmitted. In step 308, VND 120 determines whether there is room on queue 235 (a.k.a., hd_tx_queue 235). If there is, VND 120 removes one or more packets from vnd_tx_queue 225 and places those one or more packets onto hd_tx_queue 235 (step 310), otherwise VND 120 sleeps for a configurable amount of time (step 314). After step 314, the process goes back to step 308.

In step 312, VND 120 determines whether there is room on hd_tx_queue 235. If there is, then the process proceeds to step 310, otherwise the packet is removed from vnd.tx_queue 225 and discarded (step 313).

Figure 4A:
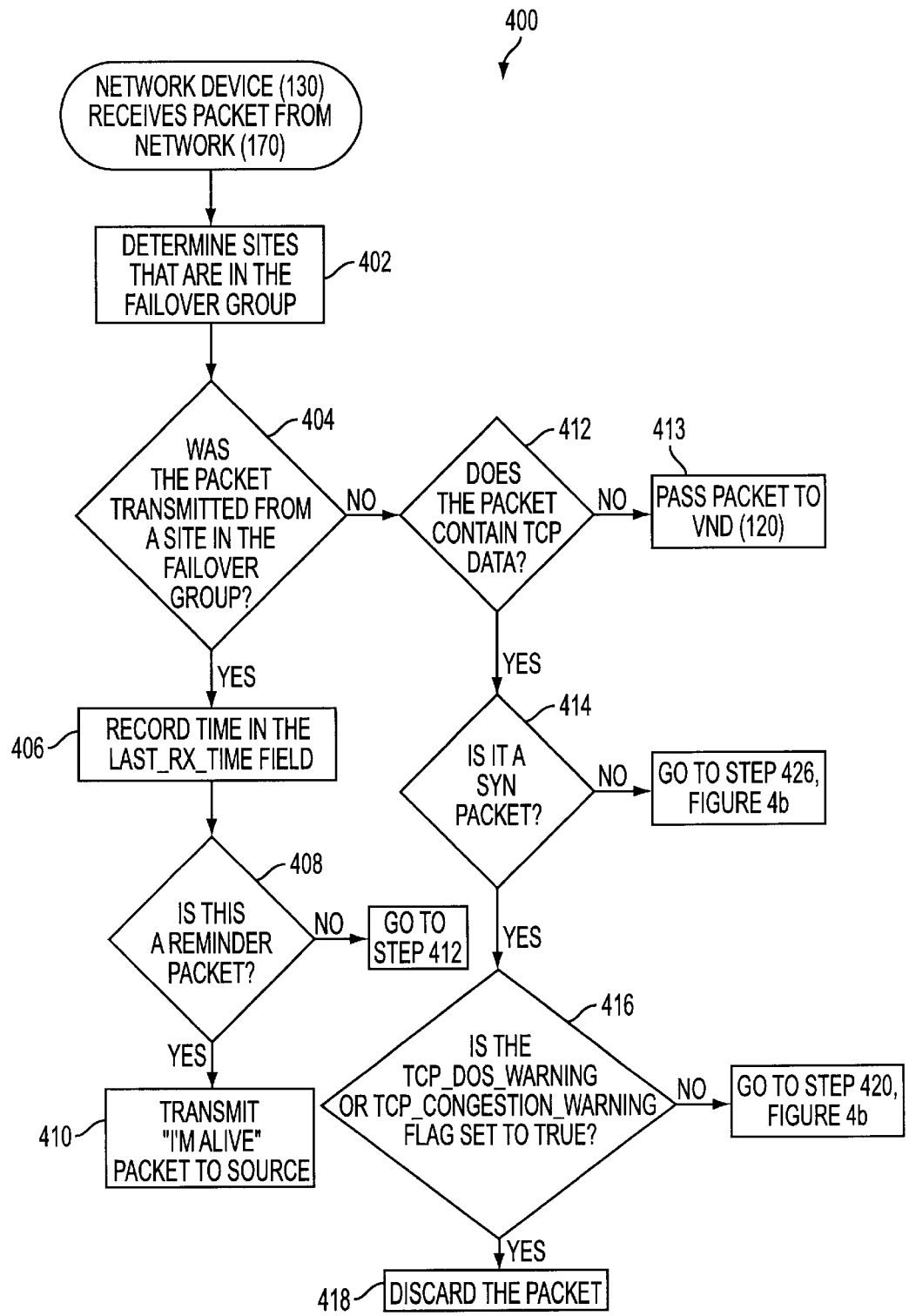
FIGS. 4A and 4B are a flow chart illustrating a process 400 performed by one embodiment of event handler 212(a) in a system according to one embodiment of the invention.
Figure 4B:
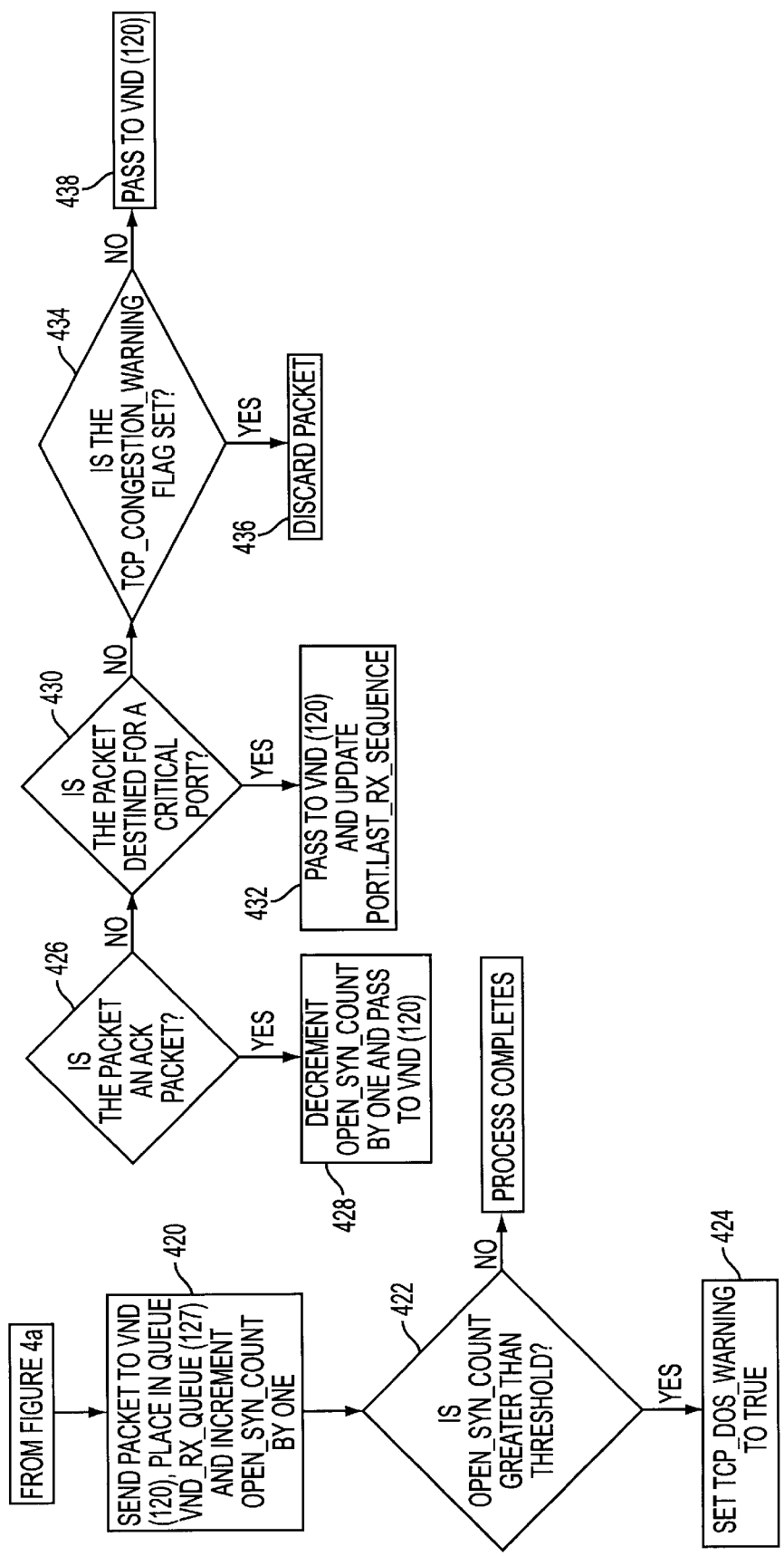

FIG. 4 is a flow chart illustrating a process 400 performed by one embodiment of event handler 212(*a*). As described above, event handler 212(*a*) is invoked after network device 130 receives a data-packet from network 170. Process 400 begins in step 402, where the event handler determines each site that is in the fail-over group. This information may be stored in control database 180.

Each site in the fail-over group has an associated site record that includes three fields. The first field is referred to as the "address" field and it stores an address of the site (the address can be a hardware address or network address). The second field is referred to as the "last_tx_time_field and it stores the time of day when system 101 last transmitted a data-packet to the site. The third field is referred to as the "last_rx_time" field and it stores the time of day when system 101 last received a data-packet from the site.

In step 404, the event handler determines whether the received packet was transmitted from a site in the fail-over group. The event handler may determine this by comparing the source address information contained in the data-packet to the address field of each site record. If there is a match, then the received packet was transmitted from a site in the fail-over group. If the data-packet was transmitted from a site in the fail-over group, then the process proceeds to step 406, otherwise the process proceeds to step 412.

In step 406, the event handler determines the current time of day and stores this time in the last_rx_time field of the site record associated with the site that was the source of the data-packet. In step 408, the event handler determines whether the data-packet is a "reminder-packet." If it is, the process proceeds to step 410, otherwise the process proceeds to step 412. In step 410, the event handler transmits an "I'm alive" message to the site that was the source of the data-packet.

In step 412, the event handler examines the packet to determine whether it encapsulates a TCP packet. If it does not, then the packet is passed to VND 120 and the process ends, otherwise the process proceeds to step 414, where the event handler determines whether the encapsulated TCP packet is a SYN packet, which is a packet that is used to initiate a TCP connection. If it is a SYN packet, then the process proceeds to step 416, otherwise the process proceeds to step 426.

In step 416, the event handler determines whether either a TCP_DOS_WARNING flag is set to TRUE or a TCP_CONGESTION_WARNING flag is set to TRUE. If either flag is set to TRUE, the received SYN packet is discarded (step 418), otherwise, the process proceeds to step 420. In step 420, the event handler passes the received SYN packet to VND 120, which places the packet into queue 227 (a.k.a., vnd_rx_queue 227), and increments open_syn_count by one (i.e., open_syn_count=open_syn_count+1). In step 422, the event handler determines whether open_syn_count is greater than a predetermined threshold. If it is, then the TCP_DOS_WARNING flag is set to TRUE (step 424), otherwise the process ends.

In step 426, the event handler determines whether the encapsulated TCP packet is an ACK packet. If it is, then open_syn_count is reduced by one and the received packet is passed to VND 120 (step 428), otherwise the process proceeds to step 430.

In step 430, the event handler determinations whether the TCP packet is addressed to a TCP port that has been labeled "critical." That is, the thread determines the TCP destination port number of the packet and then may check a list of critical ports to see if the port number is on the list. In one embodiment, a list of the critical TCP ports in maintained in control database 180. IF the TCP packet is addressed to a critical TCP port, then the thread passes the packet to VND 120 and updates port.last_rx_sequence (step 432), otherwise the process proceeds to step 434.

In step 434, the thread determines whether the TCP_CONGESTION_WARNING flag is set to TRUE. If it is, then the packet is discarded (step 436), otherwise the packet is passed to VND 120 (step 438).

Figure 5A:
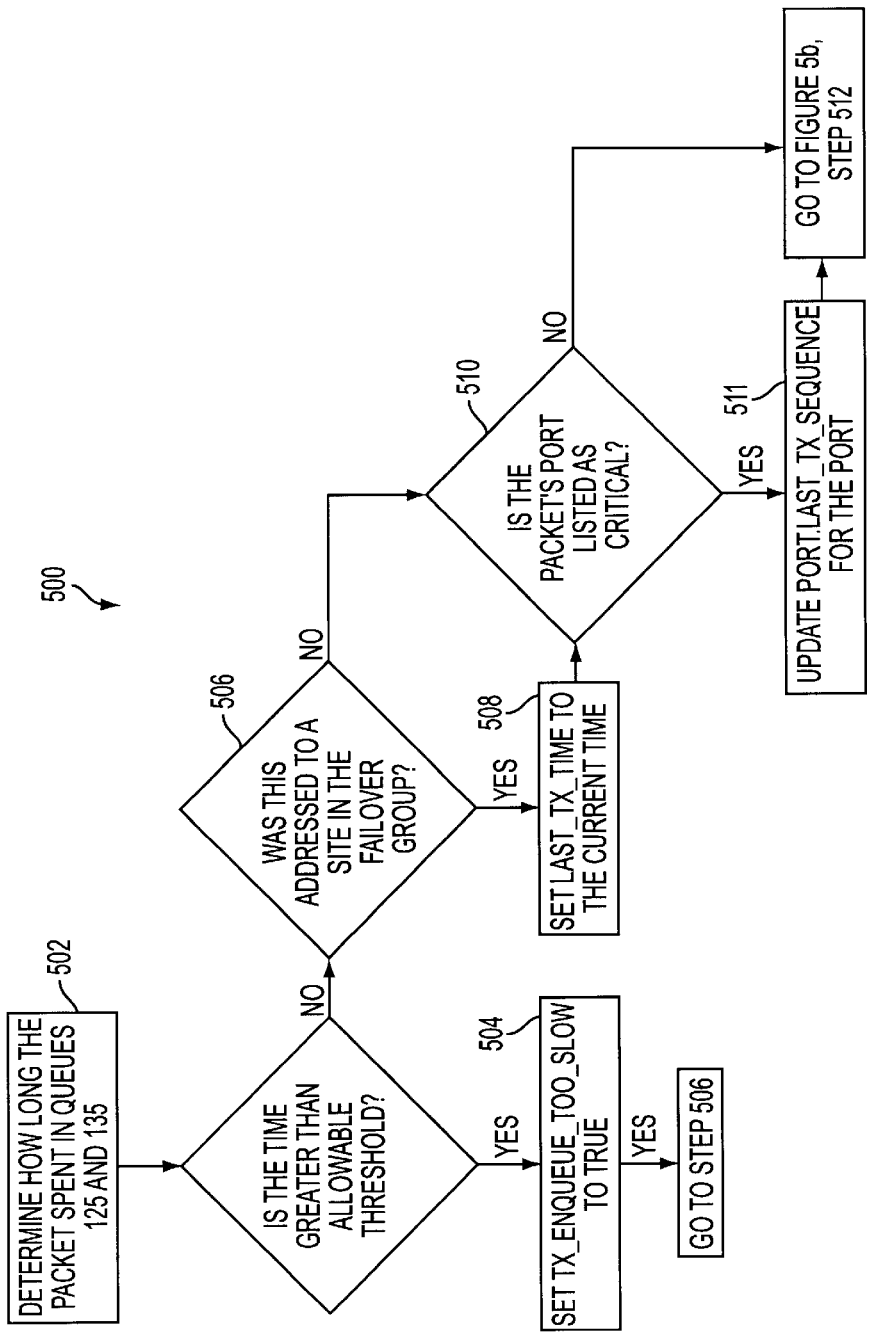
FIGS. 5A and 5B are a flow chart illustrating a process 500 performed by one embodiment of event handler 212(b) in a system according to one embodiment of the invention.
Figure 5B:
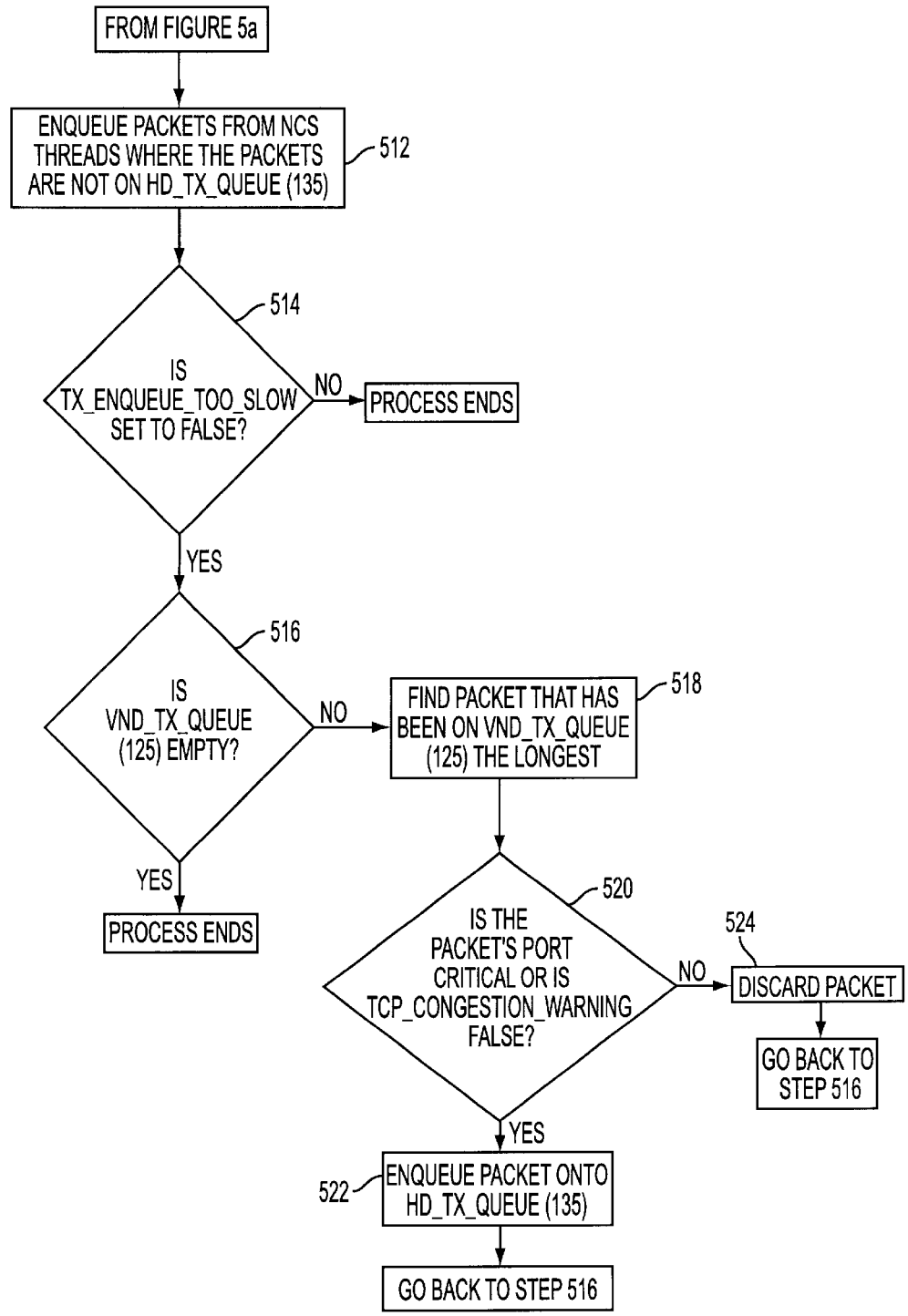

FIG. 5 is a flow chart illustrating a process 500 performed by one embodiment of event handler 212(b). As described above, event handler 212(b) is executed when a packet is transmitted by network device 130 onto network 170. Process 500 begins in step 502, where the event handler determines how much time the packet spent in the queues 225 and 235 before it was finally transmitted. If the enqueue time is more than a predetermined threshold (a.k.a., allowable TX_ENQUEUE time), then event handler sets a the TX_ENQUEUE_TOO_SLOW flag to TRUE (step 504), otherwise the process proceeds to step 506. In step 506, the event handler determines whether the packet is addressed to a site in the fail-over group. If it is, then the event handler sets the last_tx_time for the site to the current time (step 508), otherwise the process proceeds to step 510. Also, after step 508, the process proceeds to step 510.

In step 510, the event handler determines whether the packet originated from a TCP port that has been labeled as critical. If so, then the event handler updates last_tx_sequence for that port (step 511).

In step 512, the event handler enqueues any packets generated by an NCS thread (e.g., thread 213(a) or 213(b)) that are not on hd_tx_queue 235. In step 514, the event handler determines whether the TX_ENQUEUE_TOO_SLOW flag is set to FALSE. If it is, the process continues to step 516, otherwise the process ends.

In step 516, the event handler determines whether the vnd_tx_queue 225 is empty. If it is, the process ends, otherwise it continues to step 518. In step 518, the event handler selects the packet on vnd_tx_queue that has been on the queue the longest. In step 520, the event handler determines (a) whether the selected packet is a TCP packet that is addressed to a critical TCP port or (b) whether the TCP_CONGESTION_WARNING flag is set to FALSE. If either (a) or (b) is true, then the event handler enqueues the selected packet onto the hd_tx_queue 235 (step 522), otherwise the packet is discarded (step 524). After steps 522 and 524, the process goes back to step 516.

Figure 6:
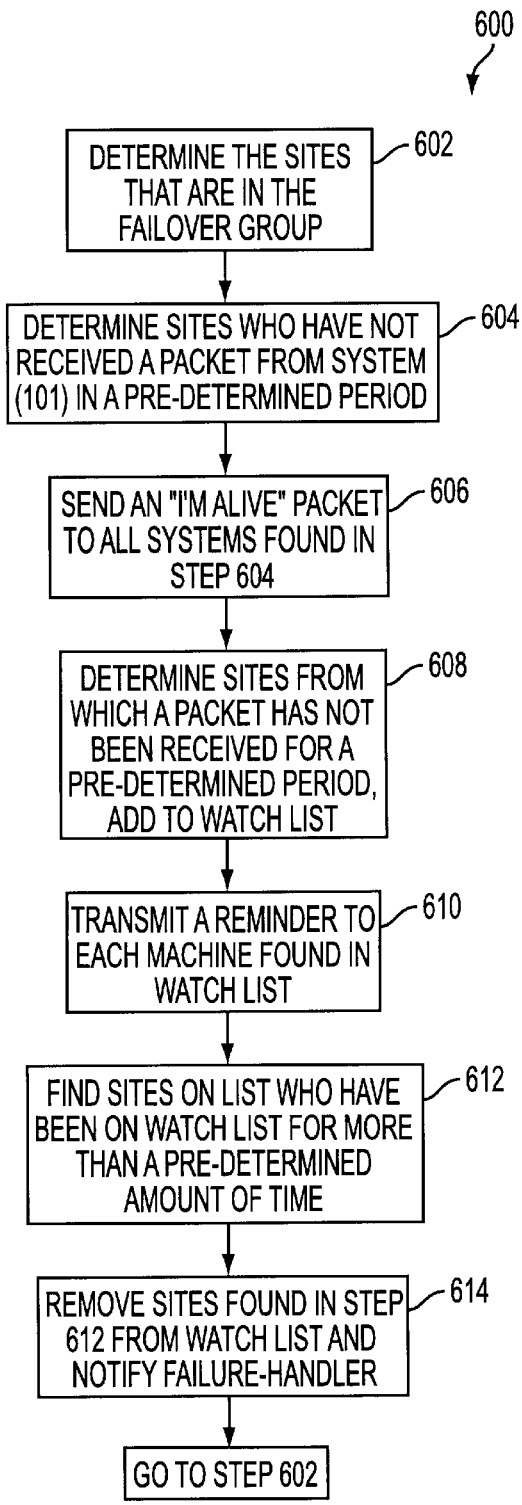
FIG. 6 is a flow chart illustrating a process 600 performed by one embodiment of thread 213(a) in a system according to one embodiment of the invention.

FIG. 6 is a flow chart illustrating a process 600 performed by one embodiment of thread 213(a). Process 600 begins in step 602, where the thread determines each site that is in the fail-over group. This information may be stored in control database 180.

Next, in step 604 the thread determines the sites in the fail-over group who have not received a data-packet from system 101 within a pre-determined period of time. The thread can determine this in a number of ways. For example, it can compare the current time to the time of last transmission, which was stored in the variable last_tx_time by event handler 212(b). In step 606, the thread transmits an "I'm alive" packet to each site determined in step 604. So, for example, if the thread determines that no data-packets have been sent to a particular site within the fail-over group within the last 30 seconds, then the thread will send the "I'm alive" data-packet to the site. In this way, the site will know that system 101 is operational because the thread guarantees that the site will, at the least, receive an "I'm alive" data-packet every 30 seconds from system 101.

In step 608, the thread determines those sites from whom system 101 has not received a data-packet within a pre-determined period of time and adds them to a "watch-list." The thread can determine the sites from whom system 101 has not received a data-packet within a pre-determined period of time in a number of ways. For example, it can compare the current time to the time when the system last received a data-packet from the site; this time was stored in the variable last_rx_time by event handler 212(a). In step 610 the thread transmits a "reminder" packet to each site on the watch-list. So, for example, if system 101 has not received a data-packet from a particular site within the last 30 seconds, then the thread will put the site on the watch-list and send the "reminder" packet to the site.

In step 612, the thread determines the site or sites on the watch list that have been on the watch list for more than a pre-determined amount of time. In step 614, the thread removes the sites determined in step 612 from the watch list and from the fail-over group and notifies a failure-handler that the sites appear to have failed. After step 614, control passes back to step 602.

Figure 7:
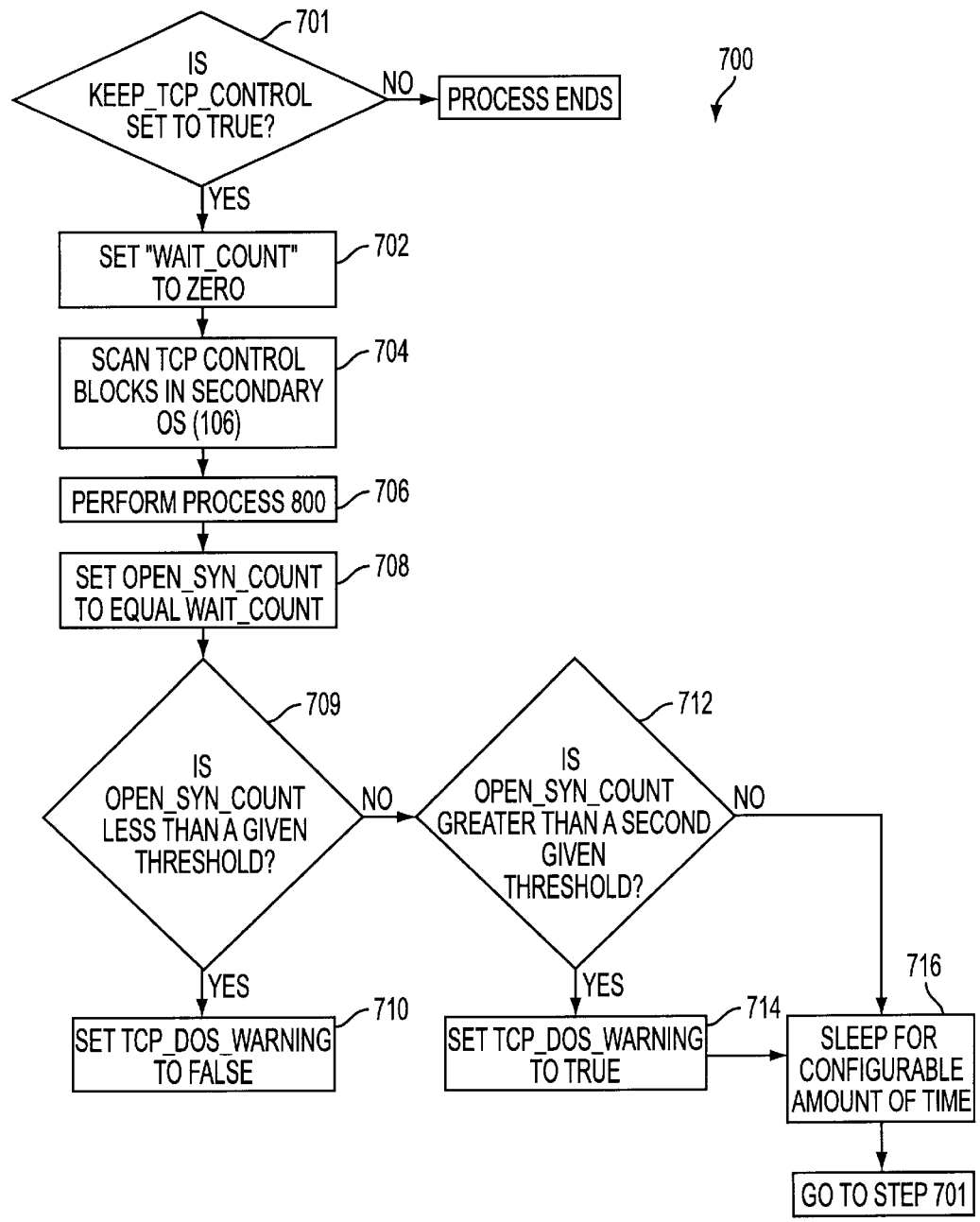
FIG. 7 is a flow chart illustrating a process 700 performed by one embodiment of thread 213(b) in a system according to one embodiment of the invention.

FIG. 7 is a flow chart illustrating a process 700 performed by one embodiment of thread 213(b). Process 700 is performed indefinitely, so long as a KEEP_TCP_CONTROL flag is set to TRUE. Process 700 begins in step 701, where the KEEP_TCP_CONTROL flag is checked to see if it is set to TRUE. If it is not set to TRUE, the process ends, otherwise the process proceeds to step 702. In step 702, the thread initializes a variable called "wait_count" to zero. In step 704, the thread scans the TCP control blocks in secondary OS 106. In step 706, thread performs process 800 (see FIG. 8) for each control block. After performing process 800 for each control block, the thread proceeds to step 708.

Figure 8:
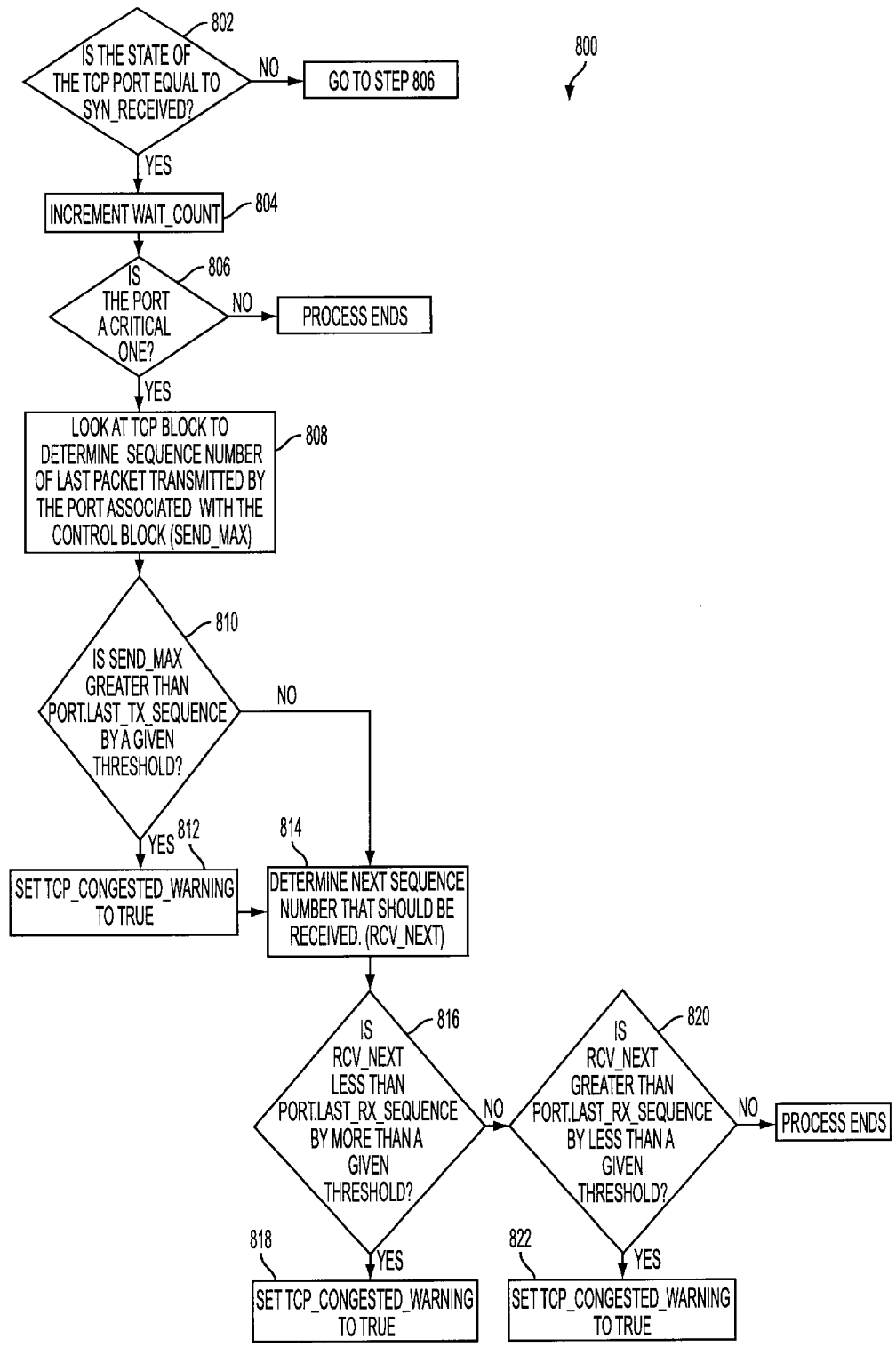
FIG. 8 is a flow chart illustrating a process 800 performed by one embodiment of thread 213(b) in a system according to one embodiment of the invention.

Referring now to FIG. 8, process 800 begins in step 802, where the thread determines if the state of the TCP port is set to SYN_RECEIVED, which means that a SYN packet has been received by the port but not yet acknowledged. The state of the TCP port is set to SYN_RECEIVED, then the thread increments wait_count (step 804), otherwise the process proceeds to step 806. In step 806, the thread determines whether the TCP port is a critical TCP port. If it is, then the thread proceeds to step 808, otherwise process 800 ends.

In step 808, the thread examines the TCP control block to determines the sequence number of the last TCP packet transmitted by the TCP port associated with the TCP control block. This sequence number is referred to as send_max. In step 810, the thread compares send_max to port.last_tx_sequence, which is a variable that stores the sequence number of the last TCP packet that was transmitted onto the network 170 and associated with the port. This information can be maintained by event handler 212(b). If send_max is greater_than port.last_tx_sequence by more than a threshold value, then the TCP_CONGESTED_WARNING flag is set to TRUE (step 812). The difference between send_max and port.last_tx_sequence provides information about the number of TCP packets that are queued to be transmitted onto network 170. If too many are queued, then the TCP_CONGESTED_WARNING flag should be activated.

In step 814, the thread examines the TCP control block to determine the next sequence number that the TCP port expects to receive. This sequence number is referred to as rcv_next. In step 816, the thread compares rcv_next to port.last_rx_sequence, which is a variable that stores the sequence number of the last TCP packet that was received from network 170 and is associated with the port. This information can be maintained by event handler 212(a). If rcv_next is less than port.last_rx_sequence by more than a threshold value, then the TCP_CONGESTED_WARNING flag is set to TRUE (step 818), otherwise the process proceeds to step 820. The difference between rcv_next and port.last_rx_sequence provides information about the number of TCP packets that are in queues 227 and 237. If there are too many packets in the queues, then the TCP_CONGESTED_WARNING flag should be activated.

In step 820, the thread determines whether rcv_next is greater than port.last_rx_sequence by less than a given threshold. If rcv_next is greater than port.last_rx_sequence by less than the given threshold, then the TCP_CONGESTED_WARNING flag is set to TRUE. This step is needed because the sequence numbers wrap.

Referring back to process 700, in step 708, the thread sets open_syn_count to equal wait_count. Next, the thread determines whether open_syn_count is less than a first threshold value (step 709). If it is, then the TCP_DOS_WARNING flag is set to FALSE (step 710). In step 712, the thread determines whether open_syn_count is greater than a second threshold value, where the second threshold value is greater than the first threshold. If it is, then the TCP_DOS_WARNING flag is set to TRUE (step 714). In step 716, the thread sleeps for a configurable amount of time. After step 716, the process proceeds back to step 701.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer program embodied on a computer readable medium for defeating a denial of service attack, wherein the computer program runs as an application of a real-time supervisory operating system, which runs a secondary operating system as an application thereof, the computer program comprising:

a computer code segment that scans all TCP control blocks in the secondary operating system;

a computer code segment that, for each of said control blocks, performs the following acts: determines whether the control block indicates that the state of the TCP port associated with the control block is SYN_RECEIVED and increments a counter if it is determined that the state of the TCP port is SYN_RECEIVED;

a computer code segment that determines whether the value of the counter is greater than a first configurable threshold; and a computer code segment that sets a denial of service attack warning flag to TRUE if the counter is determined to be greater than the first configurable threshold.

2. The computer program of claim 1, further comprising:

a computer code segment that determines whether the value of the counter is less than a second configurable threshold; and a computer code segment that sets a denial of service attack warning flag to FALSE if the counter is determined to be less than the second configurable threshold.

3. The computer program of claim 2, wherein the second configurable threshold is less than the first configurable threshold.

4. The computer program of claim 1, further comprising a computer code segment that examines a TCP control block and determines the sequence number of the last TCP packet transmitted by the TCP port associated with the TCP control block.

5. The computer program of claim 4, further comprising a computer code segment that compares the determined sequence number to the sequence number of the last TCP packet transmitted onto a network and associated with said TCP port associated with the TCP control block.

6. The computer program of claim 5, further comprising a computer code segment that issues a warning if said determined sequence number is greater than said sequence number of the last TCP packet transmitted onto the network by more than a predetermined amount.

7. The computer program of claim 1, further comprising a computer code segment that examines a TCP control block and determines the next sequence number that the TCP port associated with the TCP control block expects to receive.

8. The computer program of claim 7, further comprising a computer code segment that compares the determined sequence number to the sequence number of the last TCP packet that was received from a network and associated with the TCP port.

9. The computer program of claim 8, further comprising a computer code segment that issues a warning if the difference between said determined sequence number and the sequence number of the last TCP packet that was received from the network is greater than a predetermined amount.

10. In a computer having a real-time supervisory operating system that runs a secondary operating system as an application thereof, a method for defeating a denial of service attack, the method comprising:

examining a plurality of TCP control blocks in the secondary operating system;

for each one of said plurality of TCP control blocks, determining whether the control block indicates that the state of a TCP port associated with the control block is SYN_RECEIVED and incrementing a counter if it is determined that the state of the TCP port is SYN_RECEIVED;

determining whether the value of the counter is greater than a first threshold; and issuing a denial of service attack warning if the counter is determined to be greater than the first threshold.

11. The method of claim 10, further comprising:

determining whether the value of the counter is less than a second threshold; and setting a denial of service attack warning flag to FALSE if the counter is determined to be less than the second threshold.

12. The method of claim 11, wherein the second threshold is less than the first threshold.

13. The method of claim 10, further comprising determining the sequence number of the last TCP packet transmitted by a TCP port.

14. The method of claim 13, further comprising comparing the determined sequence number to the sequence number of the last TCP packet transmitted onto a network and associated with said TCP port.

15. The method of claim 14, further comprising issuing a warning if said determined sequence number is greater than said sequence number of the last TCP packet transmitted onto the network by more than a predetermined amount.

16. The method of claim 10, further comprising determining the next sequence number that a TCP port expects to receive.

17. The method of claim 16, further comprising comparing the determined sequence number to the sequence number of the last TCP packet that was received from a network and associated with the TCP port.

18. The method of claim 17, further comprising issuing a warning if the difference between said determined sequence number and the sequence number of the last TCP packet that was received from the network is greater than a predetermined amount.

19. In a computer having a real-time supervisory operating system that runs a secondary operating system as an application thereof, a system for defeating a denial of service attack, the system comprising:

means for examining a plurality of TCP control blocks in the secondary operating system;

means for determining whether a TCP control block indicates that the state of a TCP port associated with the control block is SYN_RECEIVED and incrementing a counter if it is determined that the state of the TCP port is SYN_RECEIVED;

means for determining whether the value of the counter is greater than a first threshold; and means for issuing a denial of service attack warning if the counter is determined to be greater than the first threshold.

20. The system of claim 19, further comprising:

means for determining whether the value of the counter is less than a second threshold; and means for setting a denial of service attack warning flag to FALSE if the counter is determined to be less than the second threshold.

21. The system of claim 20, wherein the second threshold is less than the first threshold.

22. The system of claim 19, further comprising means for determining the sequence number of the last TCP packet transmitted by a TCP port.

23. The system of claim 22, further comprising means for comparing the determined sequence number to the sequence number of the last TCP packet transmitted onto a network and associated with said TCP port.

24. The system of claim 23, further comprising means for issuing a warning if said determined sequence number is greater than said sequence number of the last TCP packet transmitted onto the network by more than a predetermined amount.

25. The method of claim 22, further comprising issuing a warning if said determined sequence number is greater than said sequence number of the last TCP packet transmitted onto the network by more than a predetermined amount.

26. The system of claim 19, further comprising means for determining the next sequence number that a TCP port expects to receive.

27. The system of claim 26, further comprising means for comparing the determined sequence number to the sequence number of the last TCP packet that was received from a network and associated with the TCP port.

28. The system of claim 27, further comprising means for issuing a warning if the difference between said determined sequence number and the sequence number of the last TCP packet that was received from the network is greater than a predetermined amount.

29. In a computer having a real-time supervisory operating system that runs a secondary operating system as an application thereof, a method for defeating a denial of service attack, the method comprising:

using a process running under the real-time supervisory operating system to determine whether a TCP control block in the secondary operating system indicates that the state of a TCP port associated with the TCP control block is SYN_RECEIVED;

incrementing a counter if it is determined that the state of the TCP port is SYN_RECEIVED;

determining whether the value of the counter is greater than a first threshold; and issuing a denial of service attack warning if the counter is determined to be greater than the first threshold.

30. The method of claim 29, further comprising:

determining whether the value of the counter is less than a second threshold; and setting a denial of service attack warning flag to FALSE if the counter is determined to be less than the second threshold.

31. The method of claim 30, wherein the second threshold is less than the first threshold.

32. The method of claim 29, further comprising determining the sequence number of the last TCP packet transmitted by a TCP port.

33. The method of claim 32, further comprising comparing the determined sequence number to the sequence number of the last TCP packet transmitted onto a network and associated with said TCP port.

34. The method of claim 29, further comprising determining the next sequence number that a TCP port expects to receive.

35. The method of claim 34, further comprising comparing the determined sequence number to the sequence number of the last TCP packet that was received from a network and associated with the TCP port.

36. The method of claim 35, further comprising issuing a warning if the difference between said determined sequence number and the sequence number of the last TCP packet that was received from the network is greater than a predetermined amount.

* * * * *